United States Patent
Jackson et al.

(10) Patent No.: US 9,148,802 B2
(45) Date of Patent: Sep. 29, 2015

(54) PREDICTIVE INDICATOR OF NETWORK SLOWDOWN

(71) Applicant: Google Inc., Mountain View, CA (US)

(72) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 13/939,128

(22) Filed: Jul. 10, 2013

(65) Prior Publication Data

US 2015/0237511 A1    Aug. 20, 2015

(51) Int. Cl.
*G06F 15/16* (2006.01)
*H04W 24/02* (2009.01)

(52) U.S. Cl.
CPC ..................... *H04W 24/02* (2013.01)

(58) Field of Classification Search
USPC ........... 455/423, 424, 425; 370/241, 249, 252
See application file for complete search history.

(56) References Cited

U.S. PATENT DOCUMENTS

| | | | |
|---|---|---|---|
| 6,023,724 A | 2/2000 | Bhatia et al. | |
| 7,831,732 B1 | 11/2010 | Zilist et al. | |
| 2006/0092850 A1* | 5/2006 | Neidhardt et al. | 370/252 |
| 2010/0157964 A1 | 6/2010 | Yoon | |

FOREIGN PATENT DOCUMENTS

EP        2388954 A1    11/2011

* cited by examiner

*Primary Examiner* — Sam Bhattacharya
(74) *Attorney, Agent, or Firm* — McDermott Will & Emery LLP

(57) ABSTRACT

A system and method for automatically providing an indication of network delay is disclosed. Software integrated into a user device is configured to identify one or more network delay indications with respect to an HTTP communication made over a network communication path, and automatically performing a network diagnostic test in response to the one or more network delay indications. The network diagnostic test generates connection information for the network communication path, and the user device provides the connection information for display to a user in a web browser.

20 Claims, 5 Drawing Sheets

PREDICTIVE INDICATOR OF NETWORK SLOWDOWN

BACKGROUND

The subject application relates to network diagnostic systems. Network delays are a common occurrence for many network connections, and particularly for network connections routed over a wireless network, such as a cellular telephone network.

SUMMARY

The subject technology provides a system and method for automatically providing an indication of network delay. The method may comprise identifying one or more network delay indications for an HTTP (hypertext transfer protocol) communication initiated from a computing device, automatically performing a network diagnostic test in response to the one or more network delay indications, wherein the network diagnostic test generates connection information for a network connection associated with the HTTP communication, and providing the connection information to a user of the computing device. Other aspects include corresponding systems, apparatus, and computer program products for implementation of the computer implemented method.

In another aspect, the subject matter also relates to a computer-readable medium comprising instructions stored therein. The instructions, which when executed by a processor, may cause the processor to perform operations comprising identifying one or more network delay indications with respect to an HTTP communication made over a network communication path, automatically performing a network diagnostic test in response to the one or more network delay indications, wherein the network diagnostic test generates connection information for the network communication path, and providing the connection information for display in a web browser associated with the HTTP communication. Other aspects include corresponding systems, apparatus, and computer program products for implementation of the operations.

In a further aspect, a system includes a display screen, one or more processors, and a computer-readable medium comprising instructions stored therein. When the instructions are executed by the processors, the processors may perform operations that identify one or more indications of a network delay for an HTTP communication initiated over a network communication path, automatically perform a network diagnostic test in response to the one or more indications, wherein the network diagnostic test automatically generates connection information for the network communication path, and provide the connection information for display on the display screen.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Figure 1:
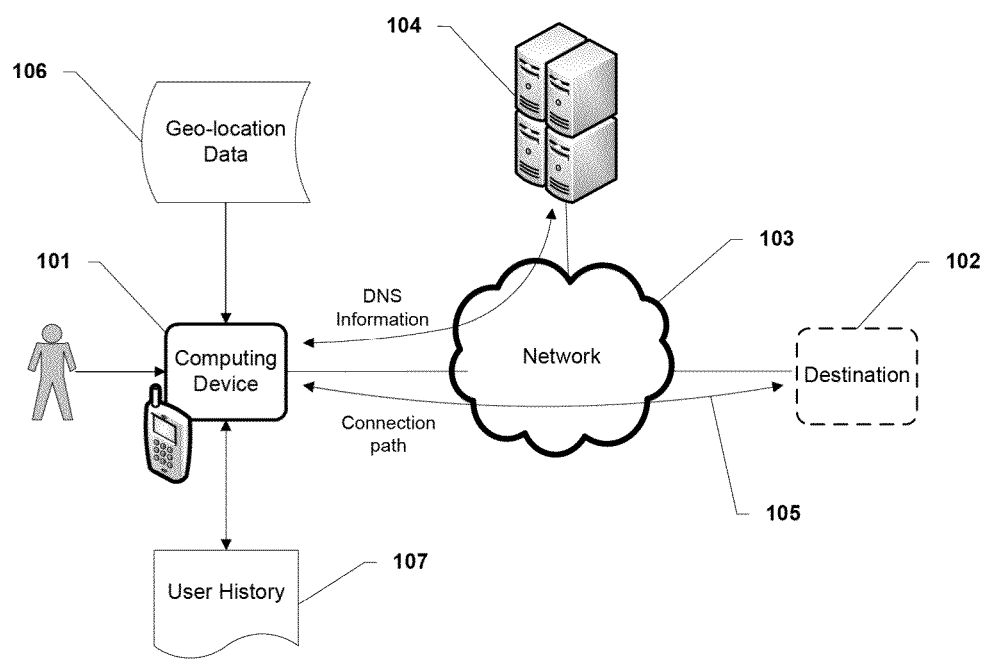
FIG. 1 depicts an example network diagram for a connection between a user device and a destination.

FIG. 1 depicts an example network diagram for a connection between a user device 101 and a destination 102, according to one or more aspects of the subject technology. User device 101 may include, for example, a smart phone, tablet or notebook or other personal computer, GPS navigation device, personal data assistant, augmented-reality glasses, or a television or other display device with one or more computing devices embedded therein or attached thereto. User device 101 is generally configured to be operably connected to a network 103 (e.g., a LAN, WAN, cellular network, or the Internet) and to communicate with other devices over network 103. User device 101 may be connected to network 103 by a wired or wireless connection, for example, by way of WiFi, Bluetooth, Ethernet, FireWire, MoCa (multimedia over coax), or other networking technology.

In the depicted example, user device 101 initiates a connection to destination 102 over network 103. Destination 103 may be another user device, a server providing, for example, a website viewable by user device 101, or other machine or computer configured to communicate over network 103 and which may provide information to user device 101 over the network. To initiate the connection, user device 101 may first send a domain name system (DNS) request to a DNS server 104 to obtain a network address (e.g., an internet protocol (IP) address) for destination 102. Accordingly, DNS server 104 determines the requested network address based on one or more network lookup tables, and returns the requested network address to user device 101 for use in a connection request to destination 102. While DNS server 104 is depicted as a separate device connected to network 103, it is understood that DNS server 103 may be integrated with user device 101, for example, as a network lookup table stored locally on user device 101.

On receiving the network address of destination 102, computing device may initiate one or more network requests to the network address to communicate with or receive information from destination 102. Network requests may include, for example, an initial connection request, subsequent HTTP requests, and the like. According to various aspects, a network request travels over network 102, along a network connection/communication path (or route) 105. In cases where communication along path 105 is significantly delayed, user device 101 is configured with hardware and/or software to automatically display connection information that indicates where (e.g., on network communication path 105) the network delay is being caused. For example, user device 101 may display to a user whether the network delay originates from within network 103, or from destination 102 in which user device 101 is attempting to communicate.

In one or more aspects, network connection information is automatically provided (e.g., to a user of a client device) upon the occurrence of a predetermined condition indicating that an associated connection is slow, or may become delayed in the future. Conditions that can trigger the display of the connection information can vary depending on implementation. For example, such predetermined conditions may include a determination that a request (for data) has gone unanswered or unfulfilled for a predetermined length of time, a determination that the user is in a location with slow network access (e.g., over a wireless cellular network), and/or a determination that a user may be en route to a geographic location that has limited or spotty network availability.

In various implementations, user device 101 is configured to be location-aware by hardware (e.g., GPS) or software, and receive geo-location data 106 as it moves with its user. User device 101 may determine that a geographic location (or area) has limited network availability based on a current network speed communicated by network 103 while the device is in the location (e.g., cellular speed provided by the cellular network), or based on a user connection history 107 for the location. In this regard, connection history 107 for a geographic location may include information obtained from user device 101 or aggregated from other devices. For example, a device configured with the subject technology may automatically and anonymously provide a central server with network connection information (e.g., upload or download speeds, signal strength, and the like) for the device's current location, or one or multiple predefined geographic areas determined based on the device's current location. As more devices are used over time and by multiple users, more detailed network information may be collected for a geographic location or area.

Connection history 107 may be accumulated by user device 101 over time and stored either locally on the device or remotely (e.g., in the cloud) for use by the device. Accordingly, user device 101 may be configured to detect its geographic location (e.g., coordinate position) and store network speeds and/or log delays for network connections or communications made or attempted by user device 101 while at its current geographic location. When the device detects that it is at, or en-route to, a stored geographic location or within a predetermined distance from the stored location, the device may access connection history 106 to lookup previously stored network speeds and/or delays for the location, or area corresponding to the location. User device 101 may determine that its user is en-route to a location based on previous paths that the user has taken, a current speed and direction of travel in relation to a current determined location, a predefined area, or the like. User device 101 may then alert the user of the device of a possible network delay based on the stored information.

User device 101 may also implement machine learning software for determining whether a user is headed for a geographic location or area that may have network connection delays. A machine learning model may include learning based on prior stored geographic locations, aggregate user data, user history, and the like. Machine learning models can include substantially any type of system such as statistical/mathematical models and processes for modeling users and determining preferences and interests including the use of Bayesian learning, which can generate Bayesian dependency models, such as Bayesian networks, naive Bayesian classifiers, and/or Support Vector machines (SVMs), for example. Other type models or systems can include but are not limited to neural networks and/or Hidden Markov Models, etc. Although elaborate reasoning models can be employed in accordance with the claimed subject matter, it is to be appreciated that other approaches can also utilized.

Additionally or in the alternative, connection history 107 may store network speeds and/or log delays for uniform resource locators (URLs) or other network locations (e.g., websites, webpages, FTP sites, and the like) visited by a web browser or file system operating on user device 101. The web browser may be configured to access connection history 107 on receiving a navigation request from a user for a URL, and to determine whether the URL corresponds to a previously stored network destination in connection history 107. If a previous attempt or connection to the network destination resulted in a delay then the user may be alerted. In the previously provided examples, a delay may be indicated upon the prior delay or network speed stored in connection with the network destination satisfying a predetermined threshold. For example, a delay may be indicated if the speed is below a predetermined transfer rate (e.g., 1 mb/second), or a delay in making a successful connection or receiving data from the network location is above a predetermined length of time (e.g., 500 ms).

In other aspects, an indication of delay with respect to communication path 105 may be determined based on a history of delays for the stored network destination or geographic location. For example, a delay may be indicated if a download speed for the network destination was below a predetermined threshold in over a predetermined number of connections (e.g., visits to a website) to the destination by user device 101. Likewise, a delay may be indicated if a network delay for communication path 105 was longer than a predetermined threshold in over a predetermined number of connections to destination 102 by user device 101.

Although certain examples provided herein can describe a user's geographic location or browser history information being stored in memory, the user can delete the information from memory and/or opt out of having the information stored in memory. In example aspects, the user can adjust appropriate privacy settings to selectively limit the types of user information stored in memory, or select the memory in which the information is stored (e.g., locally on the user's device as opposed to remotely on a server). In example aspects, the stored information does not include and/or share the specific identification of the user (e.g., the user's name) unless otherwise specifically provided or directed by the user.

Once a delay has been indicated, network connection information may be determined, for example, using various network diagnostic tools. By way of example, indications of a round trip time (e.g., between a client device and a host/server) may be provided by performing a ping operation. Furthermore, information regarding a particular network path, as well as delays occurring at each network hop or "middlebox" in the network path may be determined using a traceroute diagnostic. Based on the network connection information the user can more accurately assess the cause of the network delay.

Figure 2:
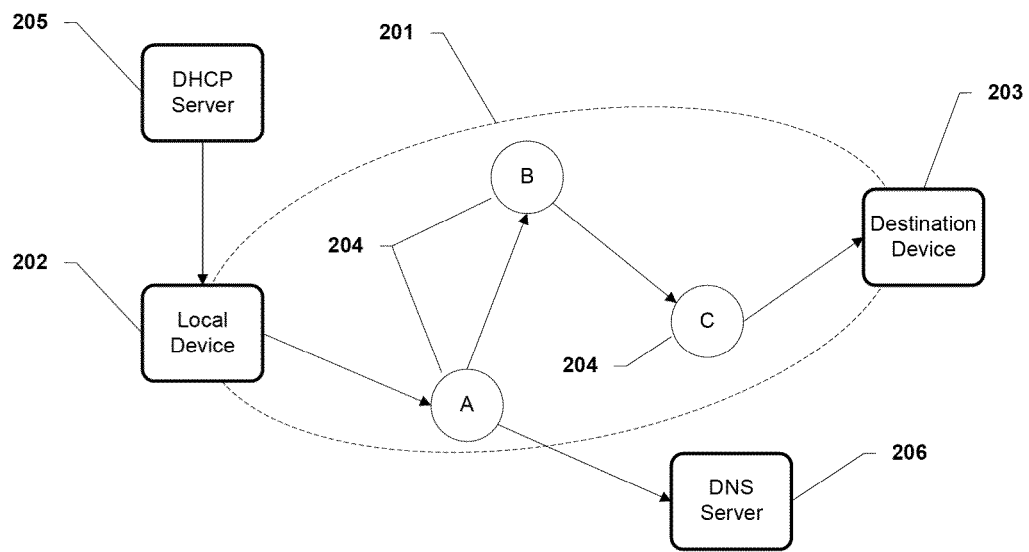
FIG. 2 depicts an example network path between a local device and a destination.

FIG. 2 depicts an example network path between a local device and a destination, according to one or more aspects of the subject technology. A network communication path 201 between a local computing device 202 and a destination device 203 may traverse one or more network nodes 204 (e.g., A, B, and C). A network node may include one or more devices for facilitating network communications, including server computers, routers, firewall, proxy server, and the like. In the depicted example, a packet sent by local computing device 202 traverses network nodes A then B then C to reach destination device 203. Accordingly, a network delay may be indicated at node A, B, or C, or at computing device 202 or destination device 203.

In one or more implementations, a network delay may be indicated by a slow loading of a web page in a web browser. The user, however, may not recognize the cause of the delay. Computing device 202 is configured to determine a delay condition from one or more technical factors. For example, computing device 202 may determine that a query or other communication transmitted by the computing device (e.g., HTTP request) has been unanswered (e.g., no HTTP response) for a predetermined time period (e.g., greater than 1 s) Computing device 202 may determine that the query could not be transmitted beyond a particular node 204. Computing device 202 may determine that a query reached the destination, but no data was returned. Computing device 202 may determine that an error was returned from code embedded in a requested webpage or other information. In one example, a delay condition may include a determination that the client device has transmitted a request for an amount of data exceeding a predetermined threshold.

Also depicted in FIG. 2 is a DHCP (dynamic host configuration protocol) server 205 for providing a network address to local computing device 202, and a DNS server 206 for providing local computing device a network address for destination device 203. When attempting to connect to destination device 203, a user may not recognize whether a delay is attributable to a node (e.g., A, B, or C), or some communication prior to the connection attempt. For example, a delay may be experienced in receiving a network address from DHCP server 205 or from DNS server 206, or a node between computing device 202 and DNS server 206. Accordingly, when an indication of delay is identified (e.g., network delay or slow connection speed), user device 101 automatically performs a network diagnostic test to generate connection information for identifying the network location of the delay to the user. The network diagnostic test may be performed in a background process (e.g., invisible to the user), or may be displayed in a dialog so that the diagnostic process may be revealed in real time to the user.

The network diagnostic test may be implemented by diagnostic software located on located computing device 202 that is configured to automatically perform a ping or traceroute operation to destination device 203 along network communication path 201, or portion thereof, in respond to an indication of delay. The network diagnostic test may automatically determine, for example, a status of a DHCP address for local computing device 202 (e.g., whether it was received), a DNS query sent by the device, a query sent to a network time protocol (NTP) server, an HTTP request sent by the device to destination device 203, or HTTP response from destination device 203. If one or more of the preceding statuses indicate an unexpected result then a delay may be indicated, and the location of the delay may be attributed to the corresponding hardware location in the network responsible for the function for which the status is given (e.g., at the DNS server).

In one or more implementations, the network diagnostic test may measure one or more transit times for packets sent by computing device 202 to one or more nodes (e.g, A, B, or C) along network communication path 201 for a given network connection. If any of the previously described delay conditions occur at one of the nodes then the node producing the delay condition may be identified as a source of, or attributable to, a network delay to the user. Additionally or in the alternative, the diagnostic test may determine whether data is received from destination device 203, and, if received, determine how much data is received over a period of time. If no data is received, or the amount of data received does not satisfy a predetermined threshold over a period of time then a problem at the host (e.g., destination device 203) may be identified as a source of, or attributable to, a network delay.

Figure 3:
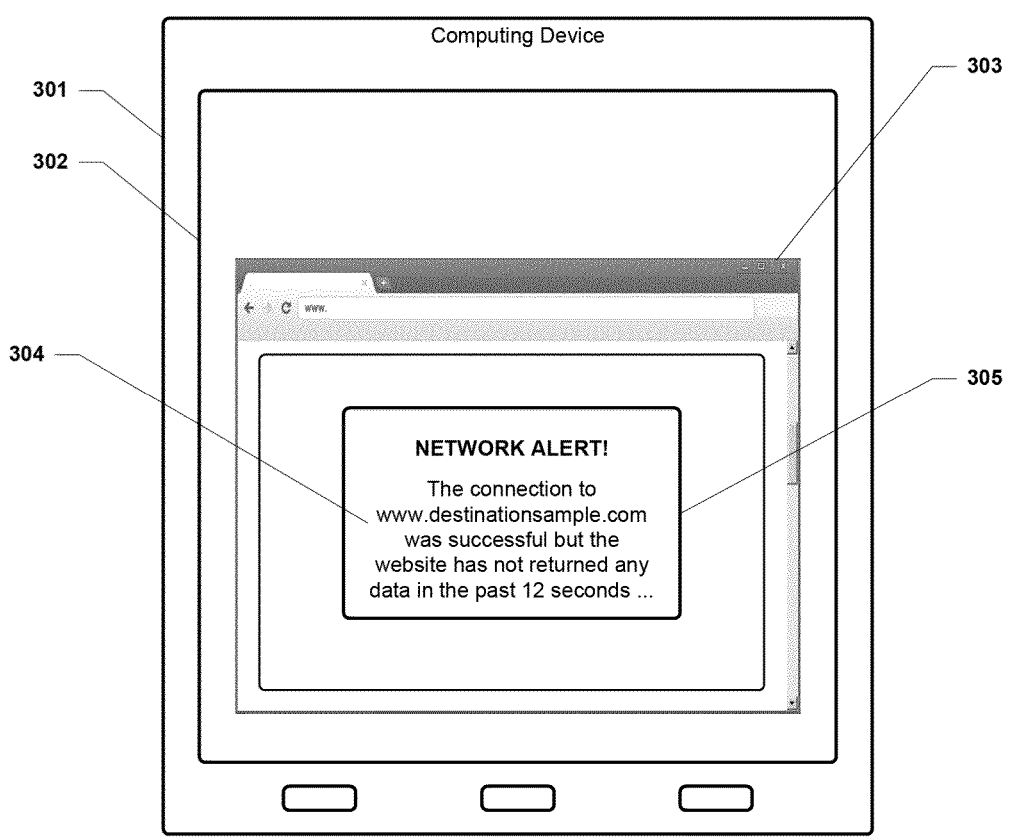
FIG. 3 depicts an example user device, including a browser and a network diagnostic alert indicating a network slowdown.

FIG. 3 depicts an example user device 301, including a browser and a network diagnostic alert indicating a network slowdown, according to one or more aspects of the subject technology. User device 301 includes a display screen 302 for display of programs stored and executed on user device 301, including a web browser 303. As depicted in FIG. 3, web browser 303 may be any typical web browser configured to operate on user device 303. Web browser 303 may be configured by code embedded therein, downloadable instructions from a website (e.g., hosted by a remote server or computing system) or a browser component which may be downloaded and embedded within the web browser, to identify network delay indications, automatically perform a network diagnostic test in response to a delay indication, and display a notification including connection information 304 about the identified network delay to the user of user device 301.

Once an indication of network delay is identified or determined using any of the previously described approaches, web browser 303, or network diagnostic software operating on user device 301 in connection with web browser 303 or network services, may display a dialog 305 or other notification mechanism for providing connection information 304 to the user. Dialog 305 may be provided for display within web browser 303, above and at least partially overlapping a portion of a display area for loading a webpage, or may be provided for display in display screen 302 by network diagnostic software operating on user device 301. In one or more implementations, connection information 304 may be displayed as a notification in a graphic bar displayed near a top (or bottom) of display screen 302 or content pane of web browser 303.

Connection information 304 specifically describes where in the current network communication path 105, 201 the delay is being caused. For example, receiving an HTTP response is a different status than receiving a "200 OK" but no data from the destination. Accordingly, if no data is received within a predetermined period of time after an HTTP response then connection information 304 may indicate that the connection was successful but the destination is has not returned data. If a query transmitted by the computing device (e.g., HTTP request) has gone unanswered (e.g., no HTTP response) for a predetermined time period then connection information 304 may indicate to a user that the connection to the destination was successful but that device 301 is "waiting on the destination." If data is being received from the destination at a speed that does not satisfy a predetermined threshold then connection information 304 may display the current speed along with an expected speed for the destination or similar destinations. If some data was received but nothing has been received for a predetermined period of time then connection information 304 may display that data was lost mid-stream, or that no data has been returned and provide the units of time (e.g., in seconds) for which no data has been returned (see message in FIG. 3).

Some webpages may be composed of multiple data components from multiple URLs that are assembled by web browser 303. If content is received from one or more URLs associated with a webpage but not one or more other URLs then the network diagnostic software of the subject technology may determine the type of content for each URL (e.g., based on extension) and provide connection information 304 that specifically identifies the problematic URL of the webpage. Likewise, a webpage may include types of code in a single document (e.g., JavaScript, HTML, and CSS). Accordingly, the software may determine the component or type of code that is causing the delay and provide connection information that identifies the component or type of content. For example, connection information 304 may display that "static content for this page is working, however, the CGI scripts appear to be broken."

As described previously, delays may be indicated outside the direct network communication path to and from a destination. For example, the delay may be attributable to lack of network access, a DHCP address problem, or with DNS services. Accordingly, if there is no network access then connection information 304 may display "waiting on network" or "waiting on the Internet." If user device 301 cannot get a mobile or Wi-Fi signal then connection information may display "waiting on mobile network," "waiting on Wi-Fi network" or similar information. Connection information 304 for encryption-related issues may include "SSL tunneling resetting" or the like.

If a DNS query was successful but a connection request or subsequent HTTP request was not successful then connection information 304 may automatically provide that information. If the DHCP address for user device 301 is being reset then connection information may provide that information. In one or more implementations, the software of the subject technology may automatically identify specific access point or terminal information to help diagnose or describe an indication of delay. For example, if network access is being provided by a public service (e.g., at an airport) connection information 304 may include a description of the service and whether certain credentials (e.g., a password) or payment is required.

The details provided by connection information 304 are not limited any one of the previously described examples. Delays may be attributable to receiving no content at all, or receiving content at a lower than expected rate. Accordingly, any one of the previously described examples may be combined to provide a detailed explanation of the identified delay. For example, connection information 304 may initially display a first issue (e.g., "waiting on internet") and then display subsequent issues as they are determined by the previously described network diagnostic test. As issues are resolved, connection information 304 may be updated to display each resolved issue as "resolved."

Figure 4:
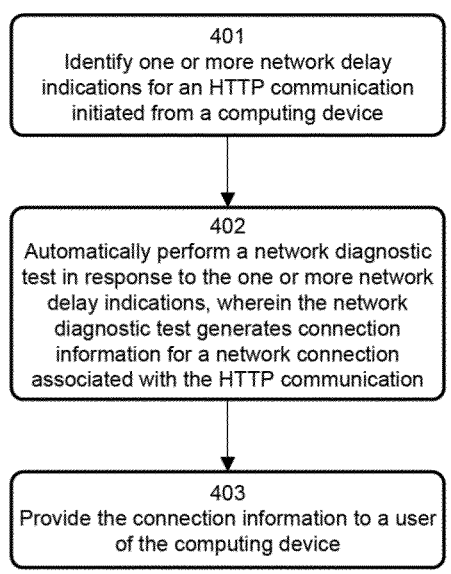
FIG. 4 depicts a flow diagram of an example method for indicating a network slowdown.

FIG. 4 depicts a flow diagram of an example method for indicating a network slowdown, according to one or more aspects of the subject technology. The blocks of FIG. 4 do not need to be performed in the order shown. It is understood that the depicted order is an illustration of one or more example approaches, and is not meant to be limited to the specific order or hierarchy presented. The blocks may be rearranged, and/or two or more of the blocks may be performed simultaneously.

According to one or more implementations, one or more blocks of FIG. 4 may be executed by user device 101, computing device 202, or other computing device of the subject technology. Similarly, a non-transitory machine-readable medium may include machine-executable instructions thereon that, when executed by a computer or machine, perform the blocks of FIG. 4. Accordingly, the blocks of FIG. 4 may be performed within the context of automatically determining a reason for a network slowdown during HTTP communications, and providing the reason to a user.

In block 401, one or more network delay indications for an HTTP communication initiated from a computing device are identified. For example, the one or more network delay indications may include a determination that a network connection is not available for the HTTP communication, a determination that a query transmitted by the computing device has been unanswered for a predetermined time period, or a determination that the client device has transmitted a request for an amount of data exceeding a predetermined threshold.

As described previously, the one or more delay indications may also include a determination that the computing device is en route to or is at a geographic location having limited network availability. In this regard, a determination that the geographic location has limited network availability may be made based on a connection history for the geographic location stored for use by the computing device. Identifying one or more network delay indications may include determining the network connection is for a destination having a history of network delays (e.g., as determined from user connection history 107 or an aggregate of user connection information for the geographic location).

In block 402, a network diagnostic test is automatically performed in response to the one or more network delay indications, wherein the network diagnostic test generates connection information for a network connection associated with the HTTP communication. In at least one example, the network diagnostic test includes determining one or more of a status of a DHCP address for the computing device (e.g., whether it was requested or received), a DNS query sent by the computing device, a query sent to a network time protocol (NTP) server, and/or an HTTP request or HTTP response for a destination of the network connection. Based on this determining a location of a network delay may be identified.

Additionally or in the alternative, the network diagnostic test may include measuring one or more transit times for packets sent by the computing device to one or more nodes along a network route for the network connection, and identifying a network problem at one of the nodes in the network route based on the measuring. In this manner, the connection information 304 identifies the network problem. The network diagnostic test may include determining whether data is received from a destination of the network connection, and, if received, an amount of the data. In this case a problem with the destination (e.g., a host computer) may be identified, and provided in connection information 304.

In block 403, the connection information is provided to a user of the computing device. As described previously, the connection information may be displayed in a web browser associated with the HTTP communication, or in a dialog displayed in connection with the web browser or on a display screen of a mobile or other computing device (e.g., on a smart phone). The connection information may also be displayed as a notification located in on the display screen (e.g., in a graphic bar near the top or bottom of the screen). In various implementations, the connection information is automatically displayed on receiving the results of one or more network diagnostic tests, and may include details for multiple delay indications, for example, generated from multiple network diagnostic tests.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
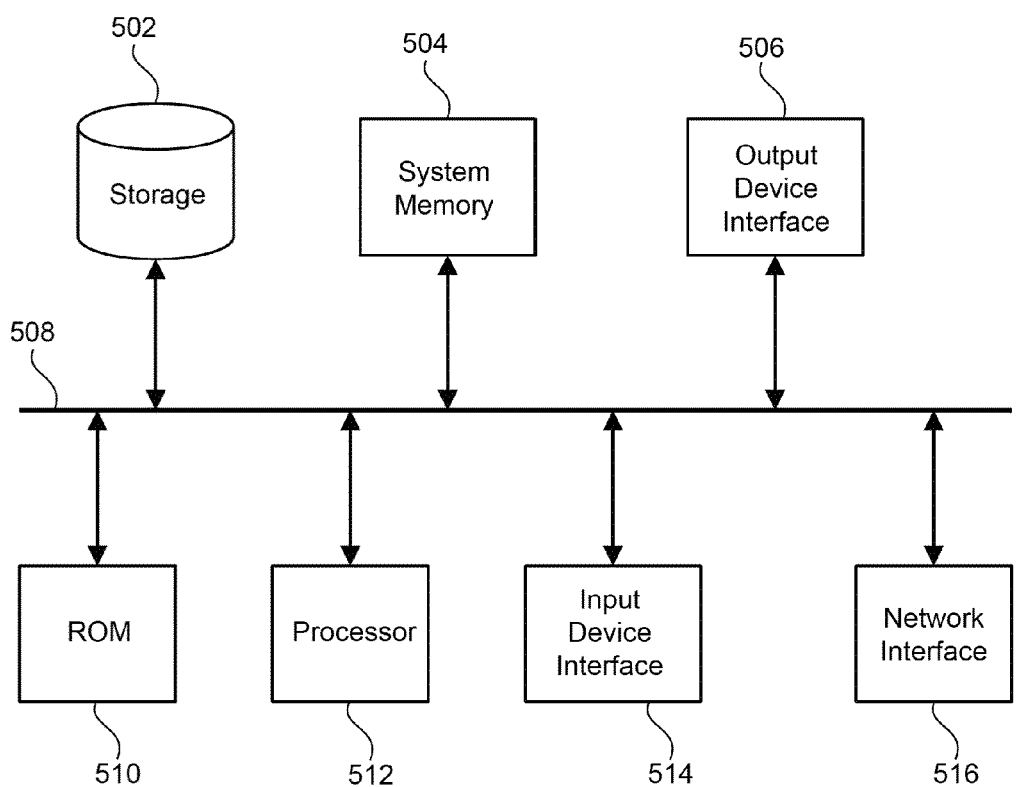
FIG. 5 is a diagram illustrating an example electronic system for use in connection with indicating a network slowdown, including a processor and other related components.

FIG. 5 is a diagram illustrating an example electronic system for use in connection with indicating a network slowdown, including a processor and other related components, according to one or more aspects of the subject technology. Electronic system 500, for example, is representative of the computing hardware embedded within, or for providing functional operation of, the previously described devices, including user device 101, computing device 202, destination device 203 DNS server 104 or 206, DHCP server 205, and the like. In one or more aspects, electronic system 500 may be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, or an external disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
    identifying one or more network delay indications for an HTTP communication initiated from a computing device;
    automatically performing a network diagnostic test in response to the one or more network delay indications, wherein the network diagnostic test generates connection information for a network connection associated with the HTTP communication;
    determining a location within a network communication path where a delay is being caused based on the connection information; and
    automatically in response to the determining, providing for display to a user of the computing device a description of the location within the network communication path where the delay is being caused.

2. The method of claim 1, wherein the one or more network delay indications comprise a determination that a query transmitted by the computing device has been unanswered for a predetermined time period.

3. The method of claim 1, wherein the one or more delay indications comprise a determination that the computing device has transmitted a request for an amount of data exceeding a predetermined threshold.

4. The method of claim 1, wherein the one or more delay indications comprise a determination that the computing device is en route to or is at a geographic location predetermined to have limited network availability.

5. The method of claim 4, further comprising determining that the geographic location has limited network availability based on a connection history for the geographic location stored for use by the computing device.

6. The method of claim 1, wherein the one or more network delay indications comprise a determination that the network connection is not available.

7. The method of claim 1, wherein identifying one or more network delay indications comprises:
    determining the network connection is for a destination having a history of network delays.

8. The method of claim 1, wherein performing a network diagnostic test comprises:
    determining a status of two or more of a DHCP address for the computing device, a DNS query sent by the computing device, a query sent to an NTP server, and an HTTP response for a destination of the network connection; and
    identifying a location of a network delay based on the determining;
    wherein the connection information identifies the location of the network delay.

9. The method of claim 1, wherein performing a network diagnostic test comprises:
    measuring one or more transit times for packets sent by the computing device to one or more nodes along a network route for the network connection; and
    identifying a network problem at one of the nodes in the network route based on the measuring;
    wherein the connection information identifies the network problem.

10. The method of claim 1, wherein performing a network diagnostic test comprises:
    determining whether data is received from a destination of the network connection, and, if received, an amount of the data received over a period of time; and
    identifying a host problem at the destination based on the determining;
    wherein the connection information identifies the host problem to the user.

11. A non-transitory computer-readable storage medium comprising instructions stored therein, which when executed by a computing device, causes the computing device to perform operations comprising:
    identifying one or more network delay indications with respect to an HTTP communication made over a network communication path;
    automatically performing a network diagnostic test in response to the one or more network delay indications, wherein the network diagnostic test generates connection information for the network communication path;
    determining a location within a network communication path where a delay is being caused based on the connection information; and
    providing a description of the location within the network communication path where the delay is being caused for display in a web browser associated with the HTTP communication.

12. The computer-readable storage medium of claim 11, wherein the one or more network delay indications comprise a determination that a query made to a computing device has been unanswered for more than a predetermined time period.

13. The computer-readable storage medium of claim 11, wherein the one or more delay indications comprise a determination that a request was made for an amount of data exceeding a predetermined threshold.

14. The computer-readable storage medium of claim 11, wherein the one or more delay indications comprise a determination that a location-aware computing device is en route to or is at a geographic location predetermined to have limited network availability.

15. The computer-readable storage medium of claim 14, the operations further comprising determining that the geographic location has limited network availability based on a stored connection history for the geographic location.

16. The computer-readable storage medium of claim 11, wherein identifying one or more network delay indications comprises:
    determining the network communication path is related to a destination having a history of network delays.

17. The computer-readable storage medium of claim 11, wherein performing a network diagnostic test comprises:
    determining a status of two or more of a DHCP address, a DNS query, a query sent to an NTP server, and an HTTP response for a destination of the network communication path; and
    identifying a location of a network delay in the network communication path based on the determining;
    wherein the connection information identifies the location of the network delay.

18. The computer-readable storage medium of claim 11, wherein performing a network diagnostic test comprises:

measuring one or more transit times for packets sent to one or more nodes along the network communication path; and identifying a network problem at one of the nodes in the network communication path based on the measuring;

wherein the connection information identifies the network problem.

19. The computer-readable storage medium of claim 11, wherein performing a network diagnostic test comprises:

determining whether data is received from a destination in the network communication path, and, if received, an amount of the data received over a period of time; and identifying a host problem at the destination based on the determining;

wherein the connection information identifies the host problem.

20. A system for automatically providing an indication of network delay, the system comprising:

a display screen;

one or more processors; and a computer-readable medium comprising instructions stored therein, which when executed by the processors, cause the processors to perform operations that:

identify one or more indications of a network delay for an HTTP communication initiated over a network communication path;

automatically perform a network diagnostic test in response to the one or more indications, wherein the network diagnostic test automatically generates connection information for the network communication path;

determine a location within a network communication path where a delay is being caused based on the connection information; and automatically in response to determining the location, provide a description of the location within the network communication path where the delay is being caused for display on the display screen.

* * * * *